(12) United States Patent
Rzhanov

(10) Patent No.: US 11,202,062 B2
(45) Date of Patent: Dec. 14, 2021

(54) METHODS AND SYSTEMS OF DETERMINING QUANTUM EFFICIENCY OF A CAMERA

(71) Applicant: University of New Hampshire, Durham, NH (US)

(72) Inventor: Yuri Rzhanov, Durham, NH (US)

(73) Assignee: UNIVERSITY OF NEW HAMPSHIRE, Durham, NH (US)

( * ) Notice: Subject to any disclaimer, the term of this patent is extended or adjusted under 35 U.S.C. 154(b) by 0 days.

(21) Appl. No.: 16/196,425

(22) Filed: Nov. 20, 2018

(65) Prior Publication Data

US 2019/0158824 A1 May 23, 2019

Related U.S. Application Data

(60) Provisional application No. 62/589,104, filed on Nov. 21, 2017.

(51) Int. Cl.
*H04N 17/02* (2006.01)
*H04N 9/04* (2006.01)
*H04N 17/00* (2006.01)

(52) U.S. Cl.
CPC .......... *H04N 17/02* (2013.01); *H04N 9/0451* (2018.08); *H04N 17/002* (2013.01)

(58) Field of Classification Search
CPC .... H04N 17/00; H04N 17/002; H04N 17/004; H04N 17/02; H04N 9/0451
USPC .......................................... 348/187
See application file for complete search history.

(56) References Cited

U.S. PATENT DOCUMENTS

| | | | |
|---|---|---|---|
| 2005/0105565 A1* | 5/2005 | Tobiason | H01S 5/141 372/20 |
| 2008/0170228 A1* | 7/2008 | Jiang | H04N 17/002 356/416 |
| 2014/0293091 A1* | 10/2014 | Rhoads | G01J 3/513 348/234 |

(Continued)

OTHER PUBLICATIONS

P. M. Hubel, et al.,"A comparison of methods of sensor spectral sensitivity estimation," Proceedings of Colour Imaging Conference: Colour Science, Systems and Applications (IS & T, 1994), pp. 45-48.

(Continued)

*Primary Examiner* — John W Miller
*Assistant Examiner* — Omer Khalid
(74) *Attorney, Agent, or Firm* — Finch & Maloney PLLC

(57) ABSTRACT

A system and method for colorimetric calibration is described herein. A system for performing color calibration is described, comprising at least one broad spectrum light emitting diode, at least one light diffuser plate, at least one interference filter, and a camera, the camera comprising at least one sensor for detection of colors, wherein a spectral response within 5% error of a ground truth method can be achieved. A method for performing color calibration is described, comprising transmitting light from at least one broad spectrum light emitting diode, scattering light with at least one light diffuser plate, filtering light with at least one interference filter, detecting light at a camera sensor, mapping an intensity value for each pixel of the camera sensor, and creating a quantum efficiency curve for each of red, green, and blue channels.

28 Claims, 12 Drawing Sheets

(56) References Cited

U.S. PATENT DOCUMENTS

| | | | | |
|---|---|---|---|---|
| 2015/0125943 A1* | 5/2015 | Molnar | ............... | G01S 3/782 435/288.7 |
| 2016/0187199 A1* | 6/2016 | Brunk | ............... | G06K 9/4661 348/89 |
| 2016/0255313 A1* | 9/2016 | Samejima | ............ | G03B 21/206 353/85 |

OTHER PUBLICATIONS

P. Longere et al., "Simulation of digital camera images from hyperspectral input," Vision Models and Applications to Image and Video Processing, C. van den Branden Lambrecht, Ed. Kluwer, 2001, pp. 123-150.

T. Ejaz, et al., "Development of a camera system for the acquisition of high-fidelity colors," IEICE Transactions on Electronics, vol. E89-C, No. 10, 2006, pp. 1441-1447.

J. Nakamura. Image Sensors and Signal Processing for Digital Still Cameras. CRC Press, 2006, pp. 4321,4323.

J. M. Dicarlo, et al. Emissive chart for imager calibration. IS&T/SID 12th Color Imaging Conference, 2006, pp. 295-301, 4321, 4322, 4323.

Y. H. Hardeberg, et al., "Spectral characterization of electronic cameras," Electron. Imaging 3409, 1998, pp. 100-109.

P. Urban, et al. Recovering camera sensitivities using target-based reflectances captured under multiple LED-Illuminations. 16th Workshop on Color Image Processing, 2010, pp. 9-16. 4321, 4322.

C.S. Mccamy, et al., "A Color Rendition Chart," Journal of Applied Photographic Engineering 11 (3) (Summer issue, 1976), pp. 95-99.

M. M. Darrodi, et al. Reference data set for camera spectral sensitivity estimation, Optical Society of America, V.32, N.3, 2015, pp. 381-391.

M. M. Darrodi, el al. "A Ground Truth Data Set for Nikon Camera's Spectral Sensitivity Estimation," 2014.

G. Finlayson, et al. Rank-Based Camera Spectral Sensitivity Estimation. J Opt Soc Am A Opt Image Sci Vis Apr. 2016; 33(4):589-99.

J.A. Worthey, et al., "Camera Design Using Locus of Unit Monochromats," Printed Publication, Color Imaging Conference, Scottsdale, Arizona, 2006, No. 14.

B. Dyas, "Robust color sensor response characterization," in Eighth Color Imaging Conference (The Society for Imaging Science and Technology, 2000), pp. 144-148.

J. Jiang, et al.,"What is the space of spectral sensitivity functions for digital color cameras?" in IEEE Workshop on the Applications of Computer Vision (IEEE, 2013), pp. 168-179.

H. Zhao, et al.,"Estimating basis functions for spectral sensitivity of digital cameras," in Meeting on Image Recognition and Understanding (MIRU, 2009), pp. 7-13.

G. D. Finlayson, et al., "Recovering device sensitivities with quadratic programming," in Sixth Color Imaging Conference: Color Science, Systems, and Applications (The Society for Imaging Science and Technology, 1998), pp. 90-95.

J.A. Worthey, et al., "Camera Design Using Locus of Unit Monochromats," Powerpoint Presentation, Color Imaging Conference, Scottsdale, Arizona, 2006, No. 14.

* cited by examiner

METHODS AND SYSTEMS OF DETERMINING QUANTUM EFFICIENCY OF A CAMERA

RELATED APPLICATIONS

This application claims benefit under 35 U.S.C. § 119(e) to U.S. Provisional Application Ser. No. 62/589,104, titled "METHODS AND SYSTEMS OF DETERMINING QUANTUM EFFICIENCY OF A CAMERA," filed on Nov. 21, 2017.

STATEMENT REGARDING FEDERALLY SPONSORED RESEARCH OR DEVELOPMENT

This invention was made with government support under National Oceanic and Atmospheric Administration (NOAA) grant number NA15NOS4000200. The government has certain rights in the invention.

TECHNICAL FIELD

This disclosure generally relates to calibration of a camera and, more specifically, relates to colorimetric calibration of a camera by means of measuring quantum efficiency.

BACKGROUND

Digital cameras require colorimetric calibration to be able to accurately record images in true red, green, and blue colors as perceived by the human eye and to be able to reliably compare colors recorded by different cameras. Some conventional techniques of colorimetric calibration involve detecting, by the digital camera being calibrated, light reflected from charts having colored patches with known reflection spectra, such as the well-known Gretag-Macbeth standard reflective color chart. These techniques require substantial time and effort, and achieve, in some situations, less than optimal results. For instance, these techniques may yield skewed results based on the patches selected during the calibration process.

Other conventional techniques involve use of a tungsten halogen light to illuminate the standard reflective color target and produce reflected light. This reflected light passes through a set of broad band interference filters to perform a colorimetric calibration. However, all of the above-mentioned techniques have weaknesses due to their yielding of a high condition number for matrixes involved in the calibration process and errors resulting from insufficient distinction between intensities detected for a given wavelength.

SUMMARY

It would be advantageous in view of the above discussion to provide methods and systems for an improved colorimetric calibration of a camera which is capable of meeting the above-identified needs. Such a method and system would provide for a colorimetric calibration that is achievable at a reduced cost, reduced time required for calibration, as well as an increased accuracy. Such a method and system would provide for a colorimetric calibration that minimizes subjectivity.

The methods and systems described herein perform or are configured to perform an improved colorimetric calibration. Colorimetric calibration may include determining color accuracy of an image taken by a camera as compared to a standard set of colors. Colorimetric calibration may also include using quantum efficiency curves to determine color accuracy. Quantum efficiency (QE) curves are properties of the sensors or plates within a camera. Some examples, disclosed herein use a full wave half maximum (FWHM) bandwidth for inversion of a matrix with elements that depend on pixel intensities and for restoration of quantum efficiency curves for red, green, and blue channels with minimal errors. More specifically, the methods and systems described herein may include a physical arrangement of light emitting diodes, diffuser plates, and interferometric filters configured to produce an array of filtered, transmitted light at discrete wavelengths that can be used to assess colorimetric calibration as well as configure the sensor of a camera to a set of standard colors. Accuracy of the colorimetric calibration is improved through use of non-overlapping wavelength spectra which minimize a condition number and produce reliable, objective results.

Accordingly, pursuant to one aspect, there is contemplated a color calibration system, comprising at least one broad spectrum light emitting diode configured to transmit light, at least one light diffuser plate, a plurality of interference filters, the plurality of interference filters configured to limit the light to a narrow band, and a processor configured to create a map of light intensity values and to determine quantum efficiency for at least red, green, and blue channels based on the light intensity values.

The system may be further characterized by one or any combination of the features described herein, such as the quantum efficiency measured by the system is within 5% error of a ground truth quantum efficiency, camera comprising at least one sensor configured to detect colors, the at least one sensor is configured to detect light transmitted by the at least one broad spectrum light emitting diode, an intensity value is mapped for each pixel of the at least one sensor, a condition number calculated during conversion of the light intensity values to quantum efficiency is between 1 and 1.5, a standard deviation of Gaussians is less than 7 nm, calibration of red, green, and blue channels fulfills a set of Luther conditions, the at least one sensor is at least one of a CMOS sensor or a CCD sensor, the quantum efficiency is a fraction of photon flux that contributes to photocurrent in a pixel of at least one sensor, a width/diameter of at least one of the plurality of interference filters is between about 1.27 cm and 2.54 cm, the plurality of interference filters is a set of at least 30 filters, the plurality of interference filters is at least one ultra-narrow bandpass filter with FWHM equal to 3 nm or less, the plurality of interference filters is a set of narrow-band bandpass filters.

Pursuant to another aspect, there is contemplated a color calibration system, comprising at least one broad spectrum light emitting diode, a camera, the camera comprising at least one sensor for detection of colors, and a mechanism for limiting the wavelengths of transmitted light received by the at least one sensor, wherein the received light is used to calibrate the at least one sensor.

The system may be further characterized by one or any combination of the features described herein, such as the mechanism for limiting wavelengths of transmitted light that reaches the at least one sensor is a set of interference filters configured in an array.

Pursuant to another aspect, there is contemplated a method of performing color calibration, comprising transmitting light from at least one broad spectrum light emitting diode, scattering light with at least one light diffuser plate, filtering light with at least one interference filter, detecting light at a camera sensor, mapping an intensity value for each pixel of the camera sensor; and creating a quantum efficiency curve for each of red, green, and blue channels.

The method may be further characterized by one or any combination of the features described herein, such as using the quantum efficiency curves to calibrate a camera, the at least one interference filter is at least one ultra-narrow bandpass filter with FWHM equal to 3 nm or less, the at least one interference filter is a set of two or more narrow-band bandpass filters, a condition number calculated during conversion of intensity values to quantum efficiency is between 1 and 1.5, the standard deviation of Gaussians is less than 7 nm, calibration of red, green, and blue channels fulfills a set of Luther conditions.

Pursuant to another aspect, there is contemplated a color calibration system, a chromatic projector contained in a housing, the chromatic projector comprising a light source, the light source connected to a power source, a light diffuser plate, and an array comprising a plurality of narrow-band interference filters, wherein light is configured to travel from the light source, through the light diffuser plate, and through the plurality of narrow-band interference filters.

The system may be further characterized by one or any combination of the features described herein, such as a first interference filter of the plurality of narrow-band interference filters limits light wavelength to be between about 478 nm and about 482 nm, a second interference filter of the plurality of narrow-band interference filters limits light wavelength to be between about 498 nm and about 502 nm, and a third interference filter of the plurality of narrow-band interference filters limits light wavelength to be between about 518 nm and about 522 nm, a camera, the camera comprising at least one lens to receive the light from the plurality of narrow-band interference filters, and at least one processor configured to create a map of light intensity values from the light received by the lens, and determine quantum efficiency for at least red, green, and blue channels based on the light intensity values.

Pursuant to yet another aspect, there is contemplated a chromatic projector comprising a housing a power source disposed within the housing an array of narrow-band interference filters disposed within the housing, each narrow-band interference filter of the array being separated from other narrow-band interference filters of the array by at least one separator wall to prevent crosstalk, at least one light source disposed within the housing and coupled to the power source, and at least one light diffuser plate disposed within the housing between the array and the at least one light source, wherein the at least one light source is configured to emit light through the array via the at least one light diffuser plate.

The system may be further characterized by one or any combination of the features described herein, such as a first interference filter of the array limits light wavelength to be between about 478 nm and about 482 nm, a second interference filter of the array limits light wavelength to be between about 498 nm and about 502 nm, and a third interference filter of the array limits light wavelength to be between about 518 nm and about 522 nm.

These aspects are not meant to be exclusive and other features, aspects, and advantages of the embodiments disclosed herein will be readily apparent to those of ordinary skill in the art when read in conjunction with the following description, appended claims and accompanying drawings. Further aspects, advantages and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The foregoing and other objects, features, and advantages of the disclosure will be apparent from the following description of particular embodiments, as illustrated in the accompanying drawings in which like reference characters refer to the same parts throughout the different views. The drawings are not necessarily to scale, emphasis instead being placed upon illustrating the principles of the disclosure.

DETAILED DESCRIPTION

Figure 1:
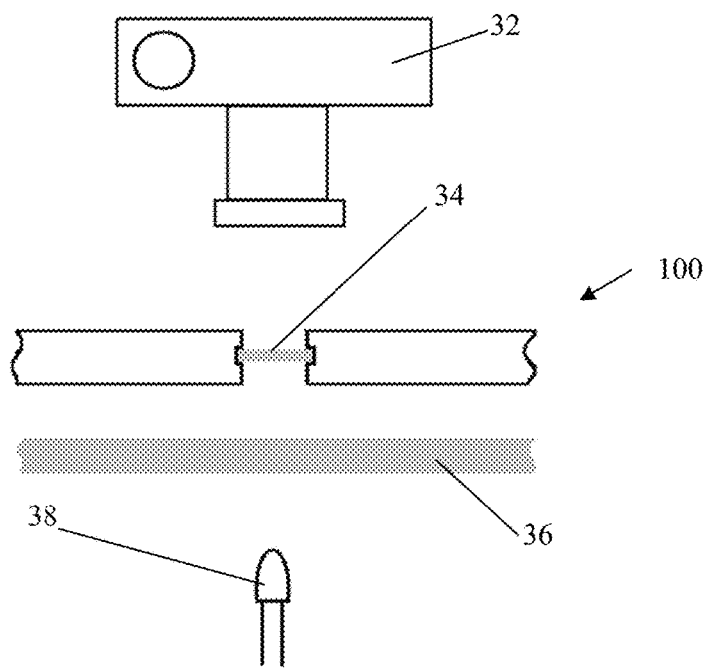
FIG. 1 is a schematic side view of a color calibration setup including use of a camera, an interference filter, a light diffuser plate, and a broad spectrum light emitting diode (LED), in accordance with one embodiment of the disclosure.

The following description provides examples of embodiments and is not intended to limit the present disclosure, application, or uses. The methods and systems described herein offer one or more solutions for colorimetric calibration of a camera. For instance, in one example, the methods and systems of colorimetric calibration described herein map colors into a color space similar to that of the human eye. The methods and systems taught herein offer a solution for determination of quantum efficiency (QE) curves. The methods and systems described herein produce a map of intensity values for each pixel of a camera sensor and perform matrix inversion using a processor to produce quantum efficiency curves for each of red, green, and blue channels. Quantum efficiency may include the fraction of photon flux that contributes to the photocurrent in a photodetector or a pixel. Quantum efficiency may also include the number of signal electrons created per incident photon, or spectral sensitivity. Quantum efficiency may also include a measurement of a device's electrical sensitivity to light. Quantum efficiency is an important parameter used to evaluate the quality of a detector and is often called the spectral response to reflect its wavelength dependence. In some cases, quantum efficiency can exceed 100% (i.e. when more than one electron is created per incident photon). In a charge-coupled device (CCD), for example, it is the percentage of photons hitting the device's photoreactive surface that produce charge carriers. Quantum efficiency can be measured in electrons per photon or amps per watt. Since the energy of a photon is inversely proportional to its wavelength, QE is often measured over a range of different wavelengths to characterize a device's efficiency at each photon energy level. The QE for photons with energy below the band gap is zero. Photographic film typically has a QE of much less than 10%, while CCDs can have a QE of well over 90% at some wavelengths.

It is desirable to ensure that the colors red, green, and blue, for example, appear consistently and reliably on a color printer, a monitor, or a display. It is desirable to ensure that the colors red, green, and blue, for example, are detected consistently and reliably by a sensor. A typical colorimetric calibration may involve use of a physical set up including a light source, a mechanism for limiting wavelengths, and a camera configured to take an image of the light source. Colorimetric calibration may include measuring illumination with a spectrometer and calculating quantum efficiency curves.

Determining the quantum efficiency of a camera is important for solving many problems related to image acquisition. These problems include color correction for comparison of colors in images acquired by different cameras and under different illumination. Another of these problems is reconstruction of a "true" color of an object imaged through an absorbing medium (e.g., water), where reconstruction includes determining the colors that the object would have if the image was taken outside the absorbing medium (e.g., in air).

One conventional colorimetric camera calibration procedure can be called the "Golden standard" technique. Some disadvantages can be associated with the "Golden standard" colorimetric camera calibration procedure, including that this procedure is time-consuming, requires expensive specialized equipment under controlled conditions. Additionally, this procedure suffers from subjectivity. As acquired images lack spatial homogeneity, averaging has sometimes been used over a 21×21 pixel patch in the center of the image. Thus, although the QE curves recovered by this technique are termed "ground truth," Applicant has found the validity of this entitlement to be questionable.

Several approaches have been proposed to simplify the calibration procedure, such as that utilizing a LED-based emissive chart, taking several images under arbitrary lighting conditions, or even taking just a single image of a multicolored target. In these approaches the image being processed is usually that of a standard reflective color target, such as Gretag-Macbeth chart, with known reflection spectra for each colored patch. Reconstruction of QE curves is an ill-posed problem, so the proposed techniques make use of additional constraints, such as smoothness of illuminant spectrum, fulfilment of Luther conditions, and non-negativity of QE functions. Ill-posedness of the problem is usually related to the limited dimensionality of the reflectance spectra. Luther conditions can be described as a set of conditions which present colors according to natural human perception. Luther conditions can also be described as presentation of colors in a manner suitable for human eyes. Luther conditions can also be described as a set of standards that helps colors appear the same for color printers, monitors, or sensors, according to the vision of an average 30 year old. Luther conditions are also commonly known as the Maxwell-Ives Criterion. The Maxwell-Ives Criterion (MI): 1.) Says that a camera will have color fidelity if its sensors are linear combinations of human color matching functions; 2.) Implies symmetry between the eye and the camera; and 3.) If a camera meets the Maxwell-Ives Criterion, then its Locus of Unit Monochromats (LUM) will be the same as that of the human eye. The LUM is a detailed picture of color mixing by the human eye.

The Munsell color system is a color space that specifies colors based on three color dimensions: hue, value (lightness), and chroma (color purity). Munsell's system is based on rigorous measurements of human subjects' visual responses to color, putting it on a firm experimental scientific basis. The influence of noise was minimized by using the principal eigenvector (or rank-deficient pseudoinverse) solution. In one example colorimetric calibration, out of 1257 reflectance spectra, only 7 or 8 were found to be really independent, and the rest can be constructed from the minimal set. Applicant notes that an optimal choice of 20 color samples gives almost as good a reconstruction of QE as use of all Munsell chips. Dynamic range of the sensor plays an important role, and the increase of the range from the common 8 to 12 bits can significantly improve the reconstruction. Simulations have shown that the best root-mean-square error for spectral sensitivity estimation is 0.01796 (using all 1269 reflectance spectra, 12 bit dynamic range). Colorimetrical calibration of data collected from camera sensors was subjected to Principal Component Analysis and the result was that just the first two principal components explain over 97% of total variance of the data for different models manufactured by two selected companies.

The present disclosure relates to objective measurement of camera sensor properties. In the present disclosure, systems and methods are described to calibrate colors using measured intensities for red, green, and blue transmitted light. The present disclosure relates to determining a quantum efficiency curve for each of red, green, and blue channels and determining how close the curves match to a ground truth set of curves. The details of the present disclosure would be applicable whether or not the camera satisfies a set of Luther conditions. A physical setup which can be used to complete a colorimetric calibration, in some embodiments, may include one or more light sources for emitting light and one or more sensors for detecting light. A physical setup which can be used to complete a colorimetric calibration, in some embodiments, may further include one or more diffuser plates, one or more interferometric filters, and a processor for interpreting a set of light intensities for one or more wavelengths of light and performing matrix inversion to produce a set of quantum efficiency curves.

Systems and methods are described which can be used with three chip cameras, for example. Three-chip cameras may include three-CCD, plate-based cameras whose imaging system uses three separate charge-coupled devices, each one taking a separate measurement of the primary colors, red, green, and blue channels. This type of camera employs a trichoic prism assembly, which directs the appropriate wavelength ranges of light to their respective CCDs. Systems and methods described herein can also be used with single sensor based cameras. Systems and methods described herein can also be used with CMOS sensors.

In single sensor cameras, each pixel of the sensor records the intensity of light which falls on it. Trichromatic cameras may use a color filter array (CFA), or color filter mosaic (CFM), which is a mosaic of tiny color filters placed over the pixel sensors of an image sensor to capture color information. A color filter array, such as a Bayer pattern, RGBE filter, RGBW filter, CYYM filter, CYGM filter, or X-Trans, can be used for this purpose. A given lens may be the size of a pixel and is positioned on top of a sensor. Light goes through colored lenses and is recorded by the pixels. Typically, with the Bayer pattern, for example, each set of 2×2 pixels have two green lenses, one blue lens, and one red lens. When light falls on a given four pixel region (2×2 pixels), the red light travels through the red lens, blue light travels through the blue lens, and green light travels through the pair of green lenses. Light travels through colored lenses and is recorded by the sensors. A demosaicing (also de-mosaicing, demosaicking or debayering) algorithm is a digital image process used to reconstruct a full color image from the incomplete color samples output from an image sensor overlaid with a color filter array (CFA). Usually, a trichromatic image will have ¼ the size of the raw image (i.e. ¼ of the pixels will be read). The intensity of green light is then averaged between the two pixel values. If a high resolution image is needed, colors need to be interpolated, for example by nearest neighbor interpolation or by linear interpolation.

It is contemplated that the improved colorimetric calibration technique described herein and associated QE curve details can be supplied from the sensor manufacturer or with a camera that uses the sensor with every batch of sensors or cameras. Colorimetric calibration can be performed on a given batch of sensors and QE curves can be published for a given batch.

Proposed Mathematical Formulation

To define notation for parameters, measured values, and spectral functions, the equations describing the color formation model for a trichromatic sensor and Lambertian shading conditions are as follows:

$$v_f = \int_0^\infty \omega I(\lambda) C(\lambda) s_f(\lambda) d\lambda, f \in \{r,g,b\} \qquad \text{EQN. 1}$$

where $v_f$ is a pixel value recorded in color channel f, $I(\lambda)$ is a light source depending on wavelength $\lambda$, $s_f(\lambda)$ is the sensor quantum efficiency, $C(\lambda)$ is the spectral signature (i.e. spectral signature of transmitted light or target reflectivity function). In some embodiments described herein, $C(\lambda)$ is a spectral signature of transmitted light which travels through one or more light diffuser plates and one or more ultra-narrow interference filters. $\omega$ describes camera-related properties, such as gain, exposure time, etc. Effectively, the integration is done over the visible range of the spectrum. By sampling spectral functions with an often chosen $\Delta\lambda=10$ nm interval the integral for pixel i can be rewritten as a sum:

$$v_{f,i} = \Sigma_{n=1}^{N} I(\lambda_n) C_i(\lambda_n) s_f(\lambda_n) \Delta\lambda \qquad \text{EQN. 2}$$

where N is a number of samples with $\Delta\lambda$ interval in the visible spectrum, and $C_i(\lambda_n)$ is the reflectance imaged at pixel i. For M color patches and known light source spectrum and patches' reflectivity spectra, the above can be rewritten in a matrix form, with $\vec{s_f} = ((\lambda_1), (\lambda_2), \ldots, s_f(\lambda_N))^T$:

$$\vec{V_f} = P\vec{s_f}, f \in \{r,g,b\} \qquad \text{EQN. 3}$$

The N*M matrix P has to be inverted (or pseudo-inverted, if M>N, i.e. an over-determined system) to obtain 3 QE curves $(\lambda_n)$. An over-determined system of equations can be solved by the least squares method. Due to this inversion being ill-posed, a number of techniques for obtaining sensible solutions have been proposed such as: Tikhonov regularization, Tikhonov derivatives-based regularization, linear models using some basis functions, and quadratic programming.

Note that M defines an upper bound for number of samples N, and the more color patches are used, the higher the spectral resolution of reconstructed QE curves. Expecting commonly accepted 10 nm resolution, not less than 31 different colors are needed for the 400 nm-700 nm range, and not less than 36 colors for the extended 380 nm-730 nm range.

Effect of Condition Number

The condition number is a measure of stability or sensitivity of a matrix (or the linear system it represents) to numerical operations. In other words, we may not be able to trust the results of inversion of an ill-conditioned matrix. Matrices with condition numbers near 1 are said to be well-conditioned. Matrices with condition numbers much greater than one (i.e. $10^5$) are said to be ill-conditioned. Condition number may include a measure of how much the output value of the function can change due to a small change in the input argument(s). Condition number is used to measure how sensitive a function is to changes or errors in the input, and how much error in the output results from an error in the input. Condition number is equal to the ratio of the largest singular value to the smallest singular value. Condition number may include the coefficient by which noise is multiplied during the process of matrix inversion.

A low condition number allows for the accuracy of the reconstructed QE curves to be limited by the noise of input data, and not by the process of matrix inversion. If the measured RGB triplets or illuminant curve are wrong, the QE curves would be wrong too. In the case of a large condition number, only noiseless data would give correct QE curves, and even small noise would be amplified so much that QE curves would contain substantial errors and yield an inaccurate result. Quantum efficiency can be measured reliably even for a system including moderate noise levels so long as condition number remains relatively low (i.e. approximately between 1 and 1.5). For condition number close to 1, no overlap between received light intensity curves is required. If a 10 nm resolution is desired, FWHM must be 3 nm or less. FWHM greater than 3 nm is sufficient for resolution less than 10 nm. If a 5 nm resolution is desired, FWHM may be approximately 1.5 nm to achieve no overlap. Noise or inaccuracy in measurements can affect the recovered QE curve result. For a system which includes non-overlapping filters, it is noise or inaccuracy in measurements that can affect the accuracy of recovered QE curves, not the process of calculations. When filters overlap in wavelength space, the condition number is typically greater than 1 and, therefore, the noise in input data is amplified upon inversion of the matrix with elements that depend on pixel values.

The original Macbeth color checker consists of 24 colored patches, which were chosen to represent primary colors and that of general interest and utility for test purposes. Current versions of the color checker manufactured by X-Rite, have 140 or 240 patches. Reflectivity of these patches is known for the spectral range 380 nm-730 nm with 10 nm resolution. An increase of the number of different colors used in QE reconstruction process or choice of an "optimal" subset of colors does not improve the stability of the solution of EQN. 3. The reason for this instability is a large condition number of matrix P. A small perturbation of input data $\vec{V}_f$ leads to dramatic changes in recovered QE curves.

Whether all the Munsell colors are used, or an optimally chosen subset of these colors, the condition number remains large and this guarantees instability upon inversion of the received data.

To get a feel of the condition number value, we have chosen at random, 36 different patches from the X-Rite color checker. Repeating colors and glossy patches were previously eliminated from consideration, leaving 189 different spectra. Increasing the number of random selections and keeping those with the smallest condition number, the latter saturates around the value of 31,000. Matrix inversion may lead to the loss of more than 4 digits of accuracy (on top of loss of precision due to the specifics of arithmetic methods and inaccuracy in input data measurements). In other words, the errors in the input data are multiplied by 31000 which results in a significantly erroneous output. This leads to a conclusion that the reflectivity spectra of the X-Rite patches are not the ones that would allow accurate QE recovery.

Figure 9:
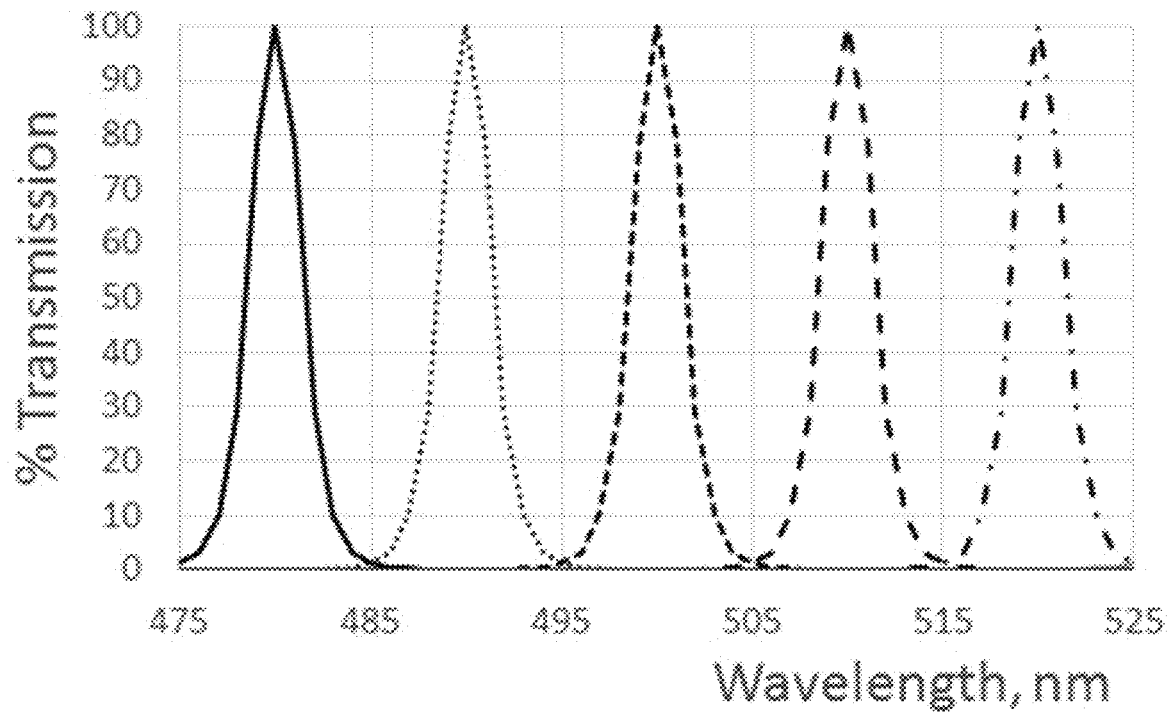
FIG. 9 is a graphical representation of percent transmission versus wavelength (nm), in accordance with one embodiment of the disclosure.

If reflectivity spectra of patches (or transmission curves of filters) comprise a disjoint set (i.e. only one spectrum has non-zero value at any wavelength, as shown in FIG. 9), the condition number associated with QE recovery problem is exactly 1, and the precision of the solution is no worse than the input data (measurements of the reflectivity spectra and RGB triplets). To estimate the bandwidth of the spectra required for noise-tolerant QE recovery, let us assume that 36 reflective spectra have a Gaussian shape with the same standard deviation of error a and maxima that are evenly distributed over the (extended) visible spectrum from 380 nm to 730 nm, i.e. number of Gaussians or number of filters is L=36. Note that this number of spectra allows for recovery of up to 36 points on each QE curve. The number of filters defines the number of recovered points on QE curves. Thus, for representation of QE curves, greater than 30 filters, greater than 20 filters, or greater than 10 filters can be used, with a higher number of filters resulting in a higher number of points on the recovered QE curves. The more filters used, the better the resolution of the recovered QE curves. To cover the visible spectrum 30 filters may be used. For the extended visible range, 36 filters may be used.

Use of ultra-narrow band-pass filter as disclosed herein guarantees almost exact mathematical inversion of the matrix because use of ultra-narrow band-pass filters guarantees that condition number will be close to 1.

Turning now to the drawings to illustrate examples of embodiments of the present disclosure, FIG. 1 illustrates a schematic side view of system 100 configured to conduct a color calibration. System 100 includes a camera 32, an interference filter 34, a light diffuser plate 36, and a broad spectrum light emitting diode (LED) 38. In this example embodiment, light is transmitted from the broad spectrum light emitting diode 38 and illuminates the light diffuser plate 36 and is thereby spread from a concentrated source to illuminate evenly the interference filter 34. The interference filter 34 narrows the wavelength range of light to a predetermined range. Subsequently, a sensor in the camera 32 detects light intensity in the form of a pixel value recorded in a color channel and a processor in the camera converts the light intensities to quantum efficiency via inversion of a matrix of intensity values (see EQNs. 1-3).

Figure 2A:
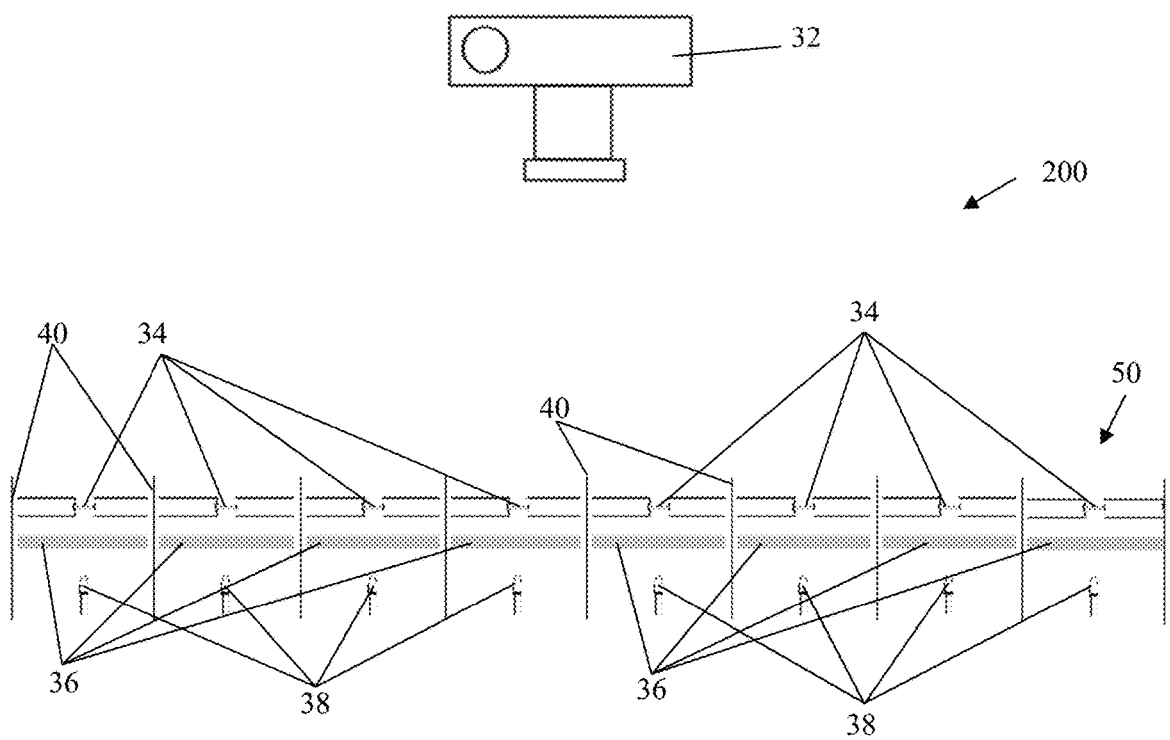
FIG. 2A is a schematic cross-sectional view of a color calibration setup including a camera and an array comprising a set of interference filters, a set of light diffuser plates, a set of broad spectrum LEDs, and a set of separator walls, in accordance with one embodiment of the disclosure.
Figure 2B:
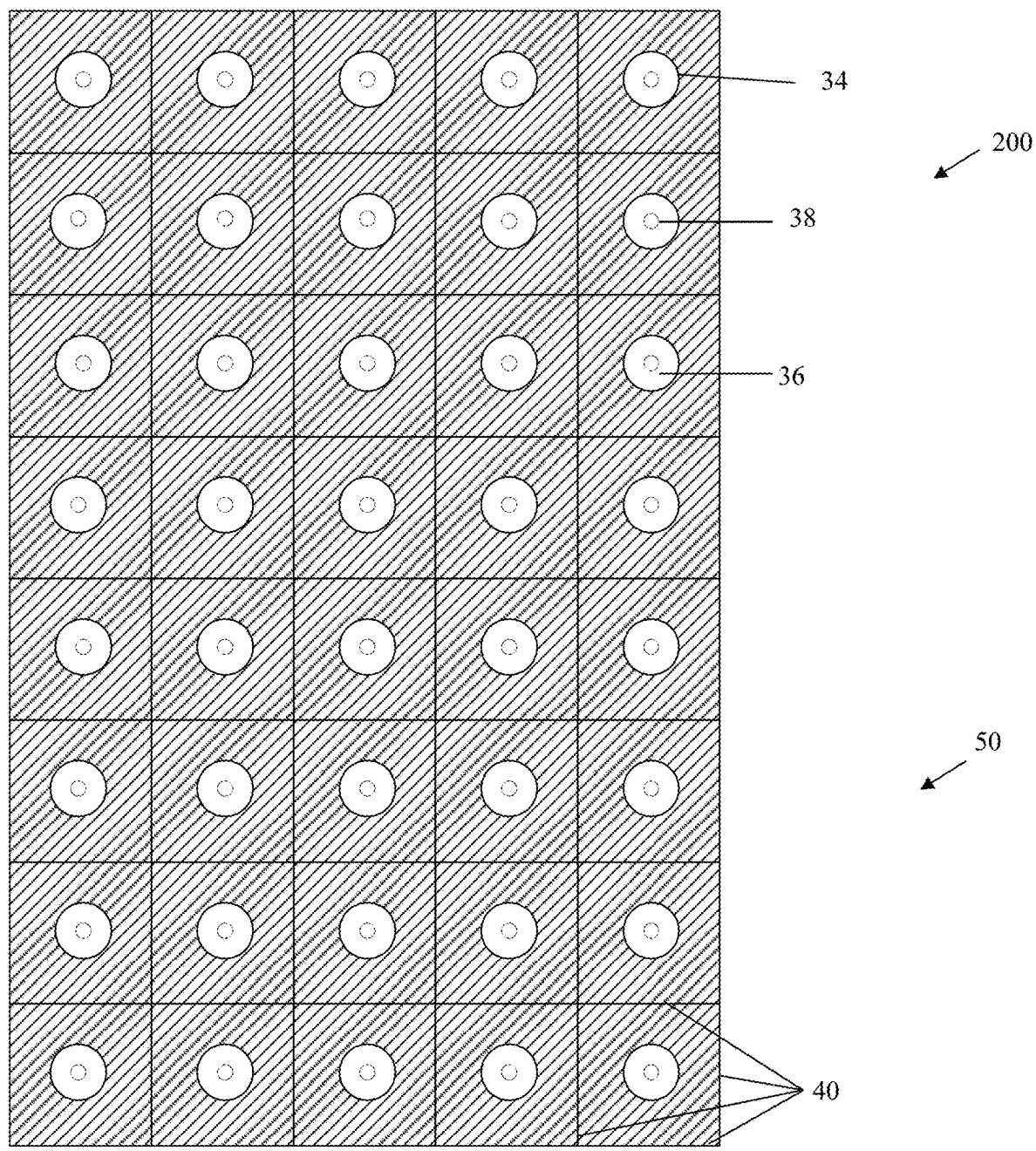
FIG. 2B is a schematic top view of a color calibration setup including an array comprising a set of interference filters, a set of light diffuser plates, a set of broad spectrum LEDs, and a set of separator walls, in accordance with one embodiment of the disclosure.

FIG. 2A is illustrates system 200, a physical arrangement of parts that can be used to complete colorimetric calibration, including camera 32 and an array 50 comprising a set of interference filters 34, a set of light diffuser plates 36, and a set of broad spectrum LEDs 38. In some embodiments, for example in system 200, an array 50 of broad spectrum LEDs 38 may be used, each back-lighting an individual interference filter 34 (FIGS. 2A-B). FIG. 2A illustrates a schematic cross-sectional view of a color calibration setup including camera 32 and an array comprising a set of interference filters 34, a set of light diffuser plates 36, and a set of broad spectrum LEDs 38, in accordance with one embodiment of the disclosure. FIG. 2B illustrates system 200, including an array 50 comprising a set of interference filters 34, a set of light diffuser plates 36, and a set of broad spectrum LEDs 38. The illustrated array 50 is 5 units by 8 units and can include 40 distinct interference filters 34 which can be targeted at 40 distinct wavelength ranges of transmitted light, in one example embodiment. Each cell is separated by a set of separator walls 40 to prevent cross talk. In alternate embodiments, different array sizes are contemplated. For example, in a first dimension, the array may be between 1 unit and 10 units wide. For example, in a second dimension, the array may be between 1 unit and 10 units long. Thus, an example array may be 6 units by 6 units, 4 units by 9 units, 5 units by 7 units, or another array size, with more or less individual cells depending on the precise nature of the colorimetric calibration desired. FIG. 2B is a schematic top view of a color calibration setup illustrating from above the view detected by a camera sensor, including an array comprising a set of interference filters 34, a set of light diffuser plates 36, and a set of broad spectrum LEDs 38, in accordance with one embodiment of the disclosure. In FIG. 2B, a 5 by 8 array is shown. It can be appreciated that the configuration in FIG. 2B may also include a set of light diffuser plates and a set of broad spectrum LEDs, with each cell containing one interference filter, one light diffuser plate, and one broad spectrum LED.

Diffuser plates may be circular or non-circular. It should be noted that separator walls 40 may be included surrounding each individual cell to eliminate cross talk. Separator walls 40 may comprise wood or plastic to block transmission of light. Interference filter 34 may be circular or non-circular. The width/diameter of interference filter 34 may be between about 1.27 cm and about 5 cm, between about 1.27 cm and about 3 cm, or between about 1.27 cm and about 2 cm, in some embodiments. It may be desirable for the colorimetric calibration system described herein to be of a compact nature, to be portable, and to be easily used with cameras of different makes and models.

Figure 15A:
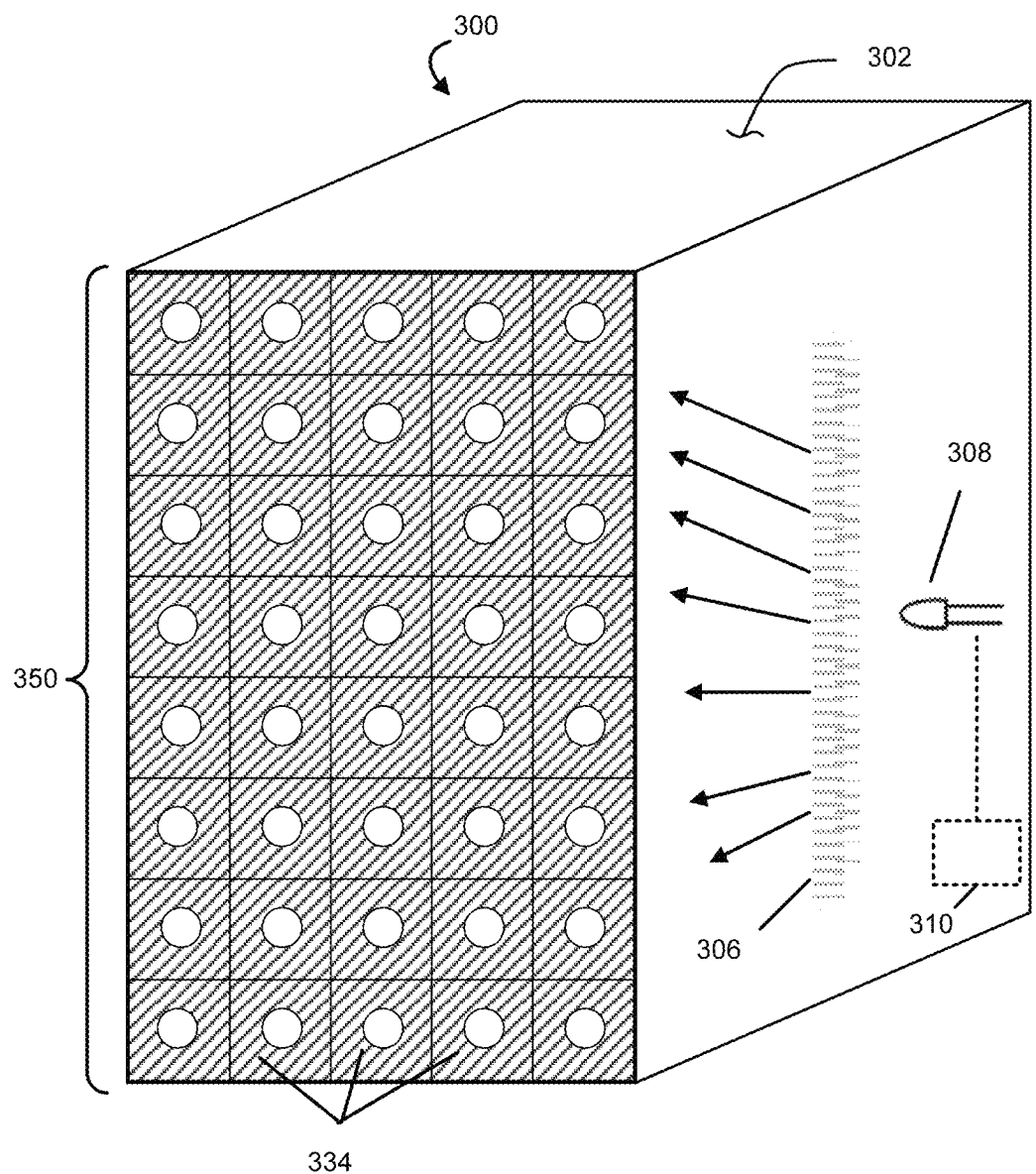
FIG. 15A illustrates a schematic side view of a chromatic projector contained in a housing including an array of interference filters, a diffuser plate, and a broad band light source, in accordance with one embodiment of the disclosure.

FIG. 15A illustrates one embodiment of a chromatic projector 300 contained in a housing 302. Chromatic projector 300 is configured to transmit a broad band spectrum of light from light source 308, through a light diffuser plate 306, and through an array of interference filters 334. Light source 308 is connected to a power port 310 containing a source of power. Light diffuser plate 306 is positioned between light source 308 and an array 350 comprising a plurality of interference filters 334. Chromatic projector 300 comprising a single light source 308 is configured to perform a colorimetric calibration as disclosed herein.

Figure 15B:
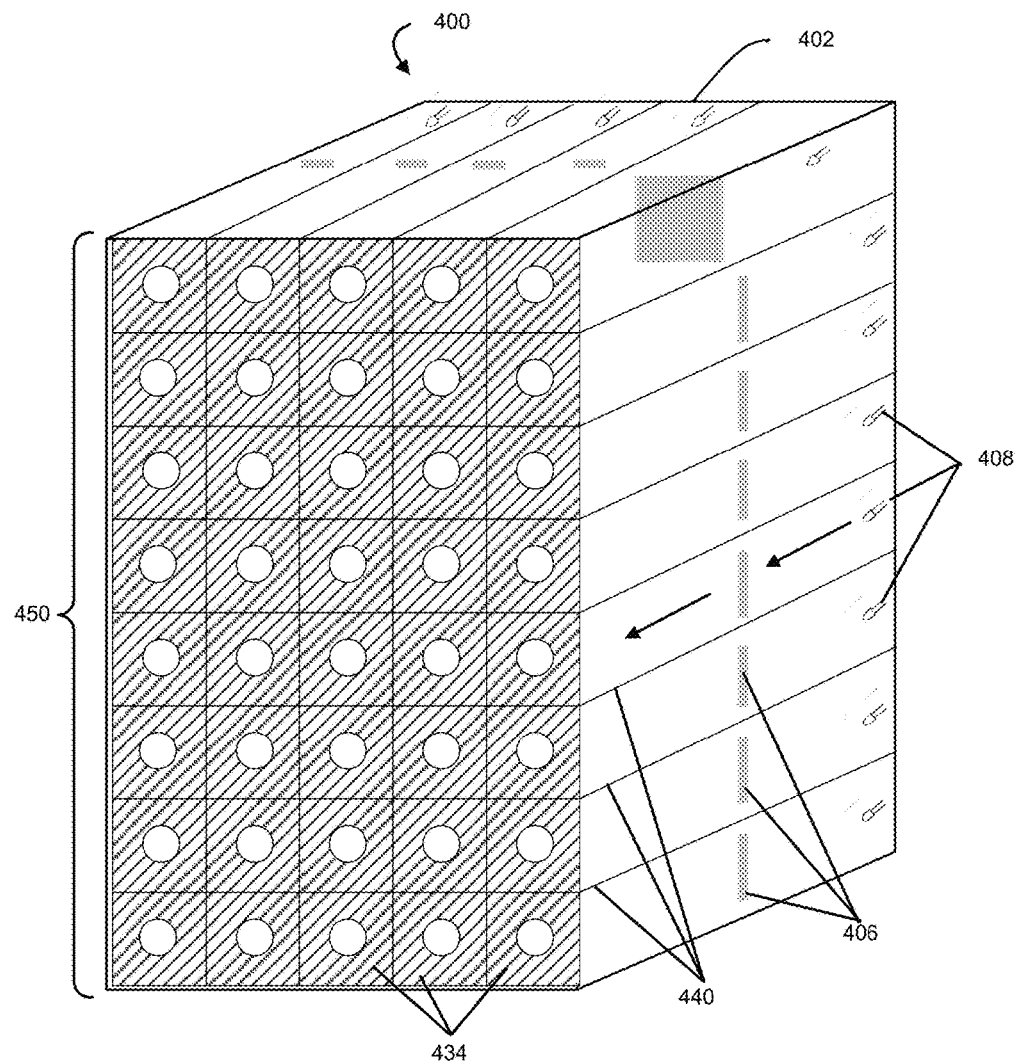
FIG. 15B illustrates a schematic side view of a chromatic projector housing including an array of interference filters, an array of diffuser plates, and an array of broad band light sources, each cell being separated by a set of separator walls, in accordance with one embodiment of the disclosure.

FIG. 15B illustrates an alternate embodiment of a chromatic projector 400 contained in a housing 402. Chromatic projector 400 an array of interference filters 434, an array of diffuser plates, and an array of broad band light sources, each cell being separated by a set of separator walls, in accordance with one embodiment of the disclosure. A plurality of separator walls 440 positioned between each of the plurality of interference filters 434 extend in a direction perpendicular to a plane of the interference filter. The plurality of separator walls 440 is configured to prevent cross-talk to prevent overlapping of wavelength ranges limited by each of the interference filters within array 450. Chromatic projector 400 comprising a plurality of light sources 408 is configured to perform a colorimetric calibration as disclosed herein.

Figure 3:
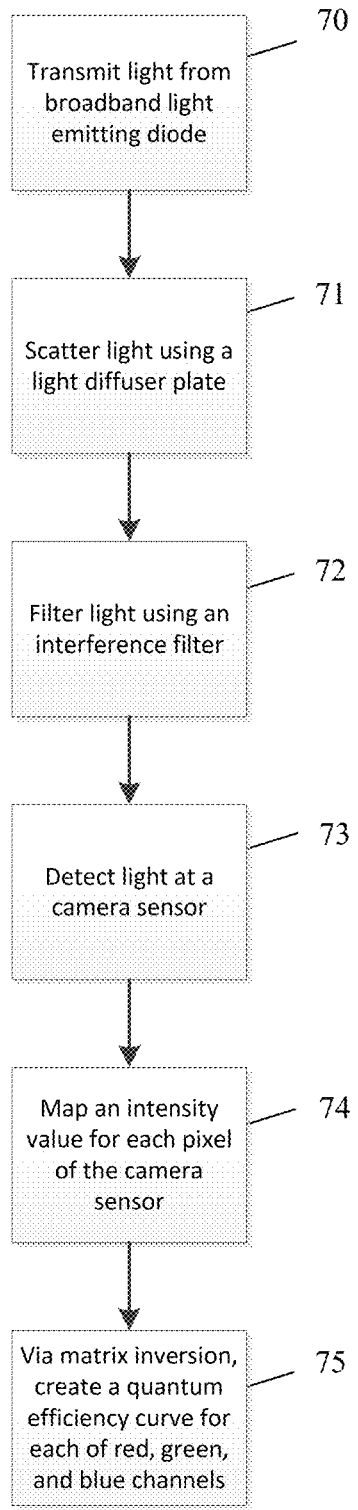
FIG. 3 is a flow chart illustrating a calibration method, in accordance with one embodiment of the disclosure.

FIG. 3 illustrates a flow chart detailing acts in a calibration method. In act 70, broadband light emitting diode transmits light. In alternate examples, an alternate light source can be used to transmit light. In act 71, a light diffuser plate scatters light. In act 72, an interference filter filters light. In act 73, a camera sensor detects light. In act 74, the camera sensor maps an intensity value for each pixel of the camera. In act 75, a quantum efficiency curve is created for each of red, green, and blue channels by a processor via matrix inversion (see EQNs. 1-3). Matrix elements received at the sensor may depend on measured pixel intensities as well as properties of the light source/illuminant. Properties of the light source/illuminant that may need to be accounted for in EQNs. 1-3 include, for example, the amount of light emitted by the light source may vary in time, the light source may take a period of time to warm up when first switched on, and the light source may transmit one wavelength range of light more intensely than another wavelength range of light (i.e. green light may be transmitted with more intensity than red light).

Figure 4:
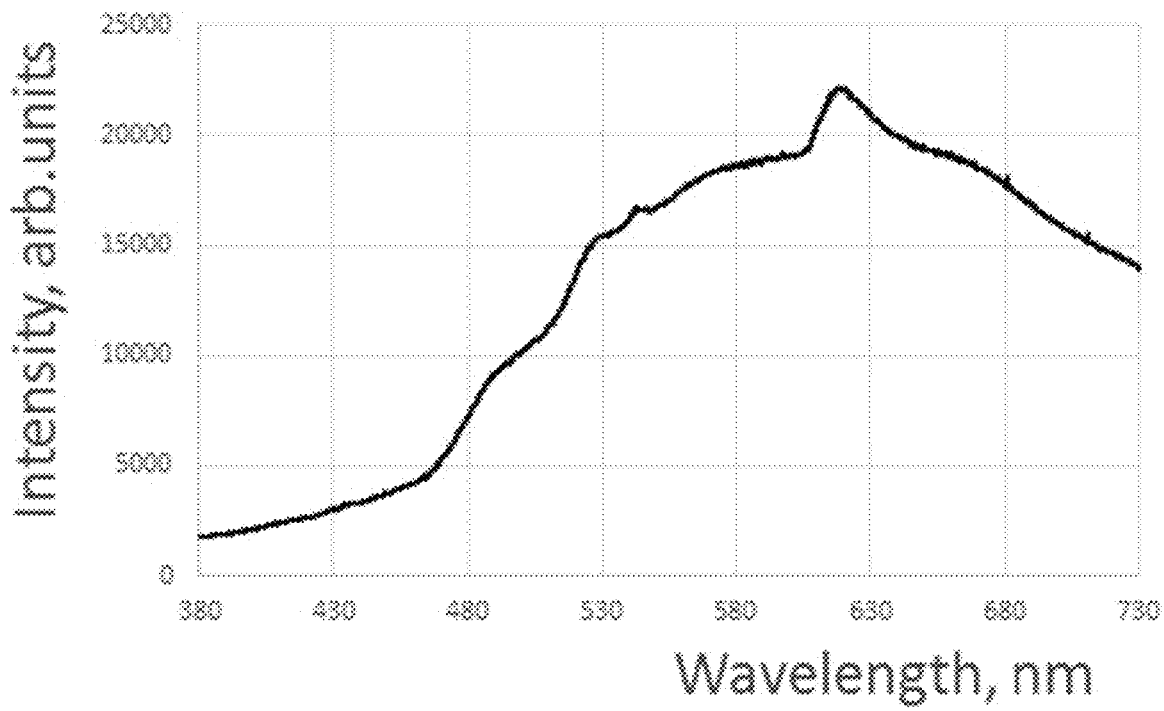
FIG. 4 is a graphical representation of intensity versus wavelength, shown in arbitrary units, in accordance with one embodiment of the disclosure.

FIG. 4 illustrates a spectrum of the illuminant used in simulations. For simulations, a standard spectrum of the incandescent lamp and QE curves was used, as shown in FIG. 4. Colors recorded by a camera 32 are calculated using EQN. 1 and are scaled such that the maximum value over all colors and all color channels equals 255 (8 bits per pixel per channel).

Then RGB values were corrupted by a random noise with the amplitude proportional to each value. Thus, K-percent noise changes pixel value ρ to $$\hat{\rho} = \min\left(0, \max\left(255, \rho * \left(1 + \mathcal{R}\frac{K}{100}\right)\right)\right),$$

where $\mathcal{R}$ is a random number in $[-1,1]$ interval. In all reported simulations K=5 has been used.

Figure 5A:
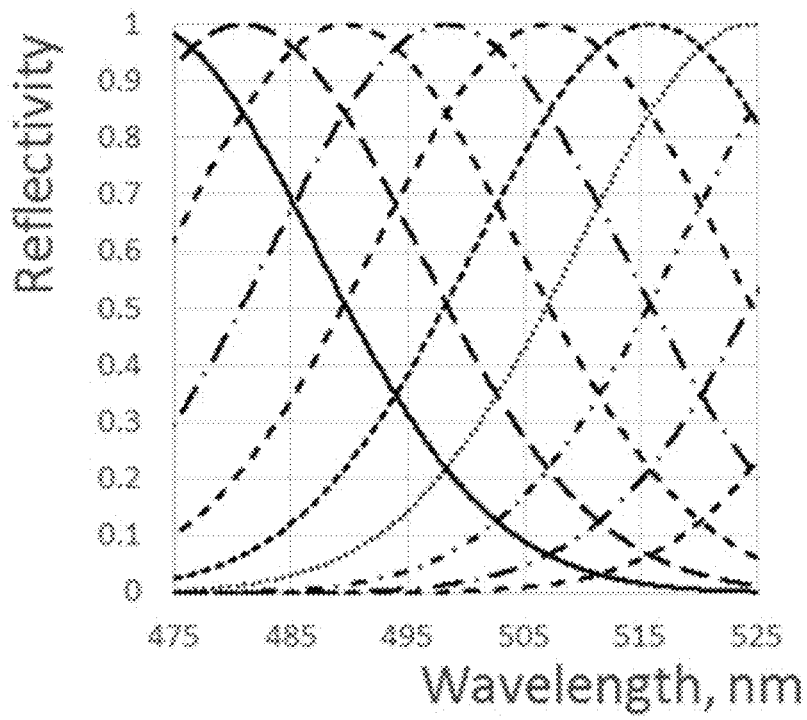
FIG. 5A is a graphical representation of reflectivity versus wavelength (nm), in accordance with one embodiment of the disclosure.
Figure 5B:
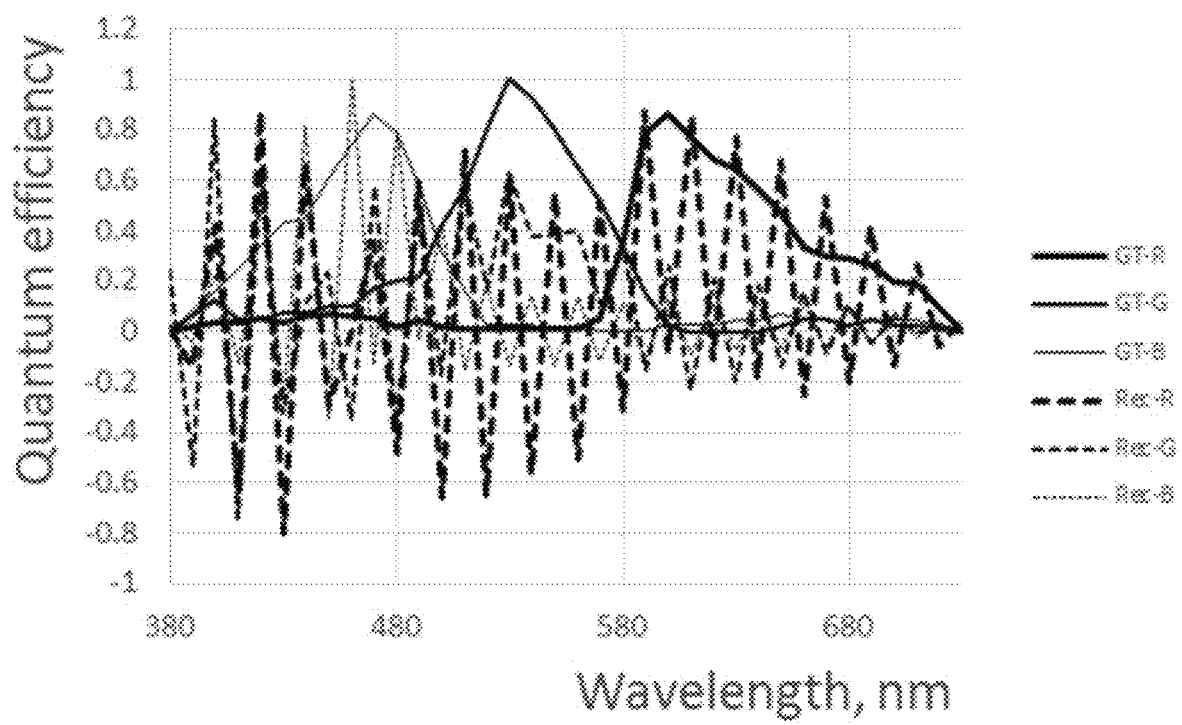
FIG. 5B is a graphical representation of quantum efficiency versus wavelength (nm) shown for red, green, and blue channels, in accordance with one embodiment of the disclosure.
Figure 6A:
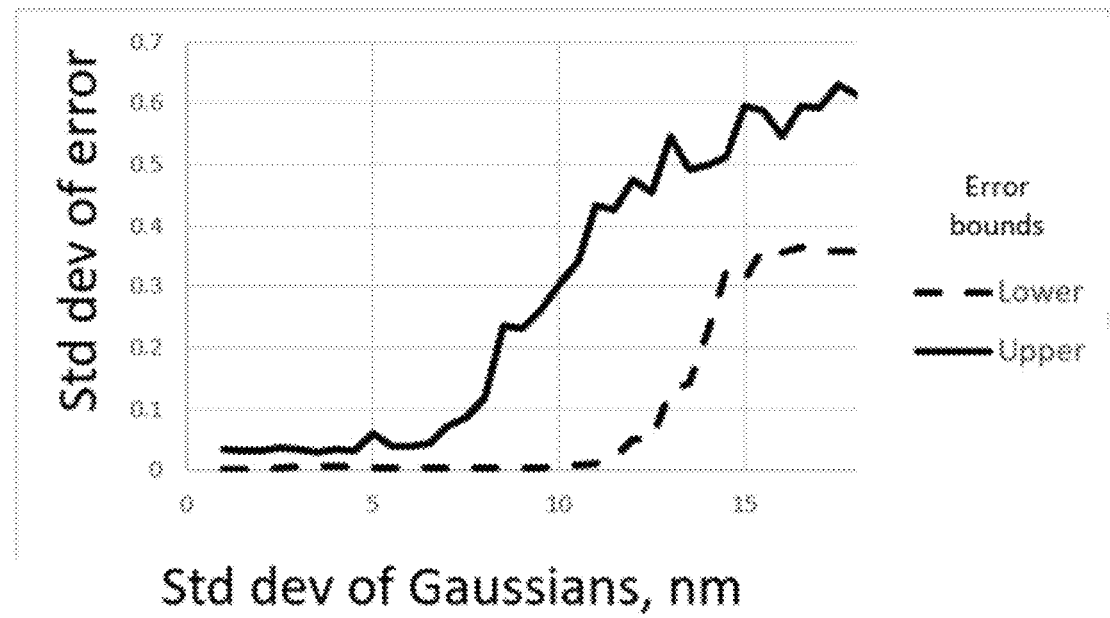
FIG. 6A is a graphical representation of the simulated lower and upper bounds of QE curves' reconstruction error versus standard deviation of Gaussians (nm), in accordance with one embodiment of the disclosure.
Figure 6B:
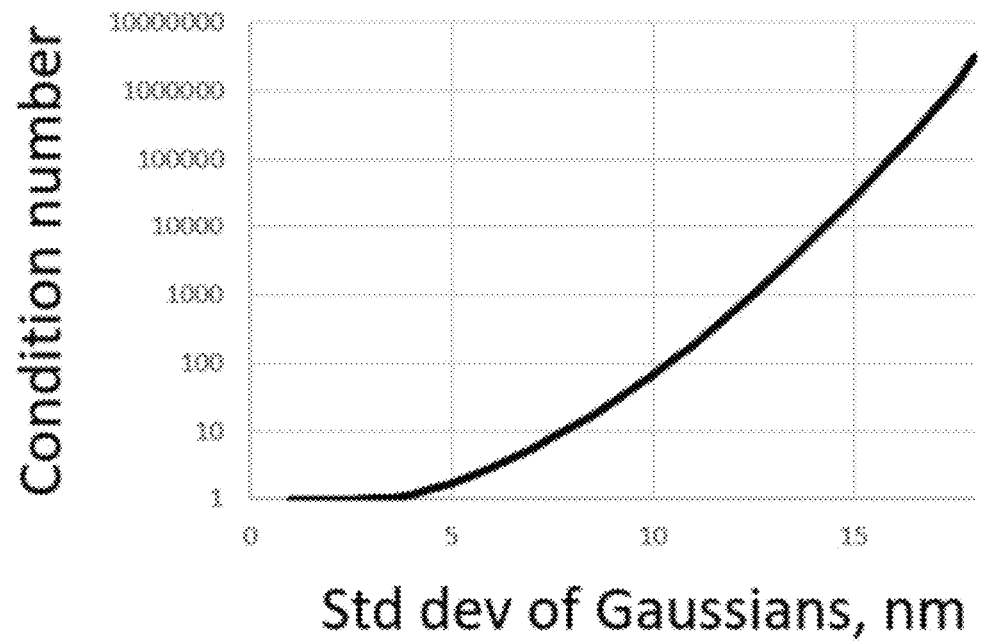
FIG. 6B is a graphical representation of condition number versus standard deviations of Gaussians (nm), in accordance with one embodiment of the disclosure.

FIG. 5A shows overlap of reflectivity spectra or transmission curves when the standard deviation of Gaussians is 15 nm. Standard deviation of Gaussians may include a measured standard deviation from a curve of Gaussian shape generated from measured light intensity at each individual filter. Any Gaussian distribution is characterized by its mean (center) and standard deviation (how wide is the bell-shaped curve). Filter transmission which is narrower will be closer to a Gaussian curve than filter transmission which is wider. FIG. 5A illustrates reflectance spectra at wavelengths between 475 and 525 nm. FIG. 5B shows a comparison of ground truth (GT) and the recovered (Rec) QE curves. It is noted that deviation occurs between the ground truth QE curve and the recovered QE curves, as the standard deviation of Gaussians is higher than desirable, at 15 nm. The recovered QE curves shown in FIG. 5B show a strong correlation is lacking as compared with the "ground truth" method. Quantity reflecting the quality of recovery is $$E(\sigma) = \sqrt{\Sigma_{k=1}^{L}(Q_k^{GT} - Q_k^R(\sigma)^2)}$$

where $Q_k^{GT}$ is the ground truth value of QE at k-th wavelength, and $Q_k^R$ is the corresponding recovered value. Reduction of the standard deviation of Gaussians to 10 nm leads to almost perfect recovery of the QE curves. FIG. 6A shows a dependence of the lower and upper bounds of QE curves' reconstruction error on the standard deviation of Gaussians. Noise in the curves is due to the simulated nature of the results with random noise in the input data. Noise used in simulations is 5%, but with the standard deviation less than 7 nm, the upper bound of error does not exceed 0.05. FIG. 6B shows the dependence of condition number on the standard deviation of Gaussians. It can be seen that the condition number is almost constant for the standard deviation less than 4 nm and after that grows faster than exponentially. The main result of the simulation is that the reduction of the standard deviation of Gaussians representing reflectivity spectra of color chips from 15 nm to 3 nm leads to a change from senseless recovered QE curves to almost perfect ones. Thus, use of ultra-narrow band-pass filters allows for a reduction in the standard deviation of Gaussians and improved QE curve results.

Paints or pigments with reflectivity spectra satisfying the criteria formulated above may be hard or impossible to find. As a result, the embodiments described herein use transmitted light instead of reflected light to get around this deficiency. In some embodiments, the system includes a set of light emitters that are configured such that light received by one or more sensors is limited to a narrow band. In some embodiments, the system includes a set of light emitters that are configured such that light received by one or more sensors is limited to an ultra-narrow band. In some embodiments, narrow band filters include filters that are configured to limit a wavelength of light that passes through them to 15 nm or less, 12 nm or less, or 10 nm or less. In some embodiments, ultra-narrow band-pass filters include filters that are configured to limit a wavelength of light that passes through them to 5 nm or less, 3 nm or less, or 2 nm or less. The system of light emitters is configured such that light received by one or more sensors is limited to a narrow band can be utilized to conduct colorimetric calibration. Interference filters 34 with ultra-narrow transmission bands are available from many manufacturers. The color reconstruction for red, green, and blue is generally poor for broad band light and good for narrow band light. Thus, it would be desirable to use an interference filter 34 to limit the transmitted light to one of red, green, or blue, for example, to obtain an improved color reconstruction. In some embodiments, photographs of the color checker board and the spectral power distribution from each patch recorded by a spectrophotometer were then used to estimate the QE curves of a camera 32. A set of interference filters 34 with non-overlapping bands was selected, a light source was used to illuminate through a diffusion plate and photograph the transmitted light. In some embodiments, forty interference filters 34 may be assembled in a 5×8 array. In some embodiments, the array of interference filters 34 may span an area not less than 10 cm×16 cm. In some embodiments, use of a single light source is inconvenient due to the potential for inhomogeneous illumination of different interference filters 34 with a large array size.

In the array design, each LED can be calibrated for light intensity. From each LED, a single value can be obtained, i.e. intensity of light for the corresponding wavelength of light. A single image showing light intensities for the desired wavelengths of light can be used to produce quantum efficiency curves for red, green, and blue channels. The quantum efficiency curves can then be compared to the ground truth and provide a means for calibrating colors in a camera.

In some embodiments, for example in system 100, a single broad spectrum light emitting diode 38 may be used with a single interference filter 34 and light diffuser plate 36 (FIG. 1).

Figure 7:
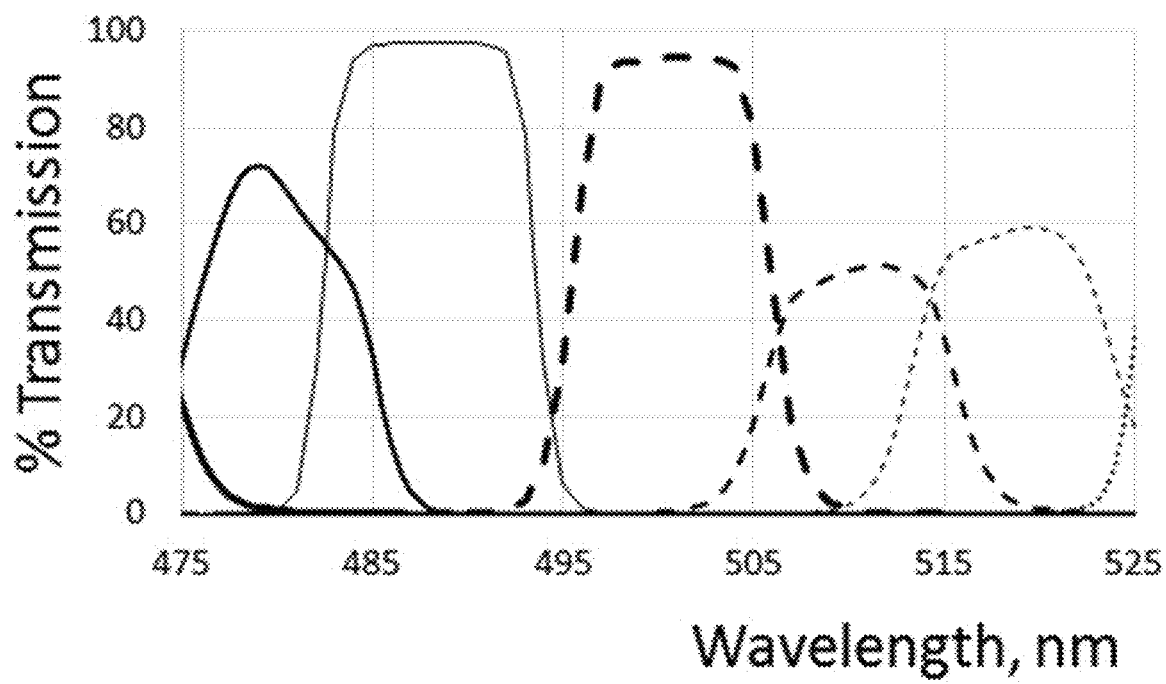
FIG. 7 is a graphical representation of percent transmission versus wavelength (nm), in accordance with one embodiment of the disclosure.
Figure 8:
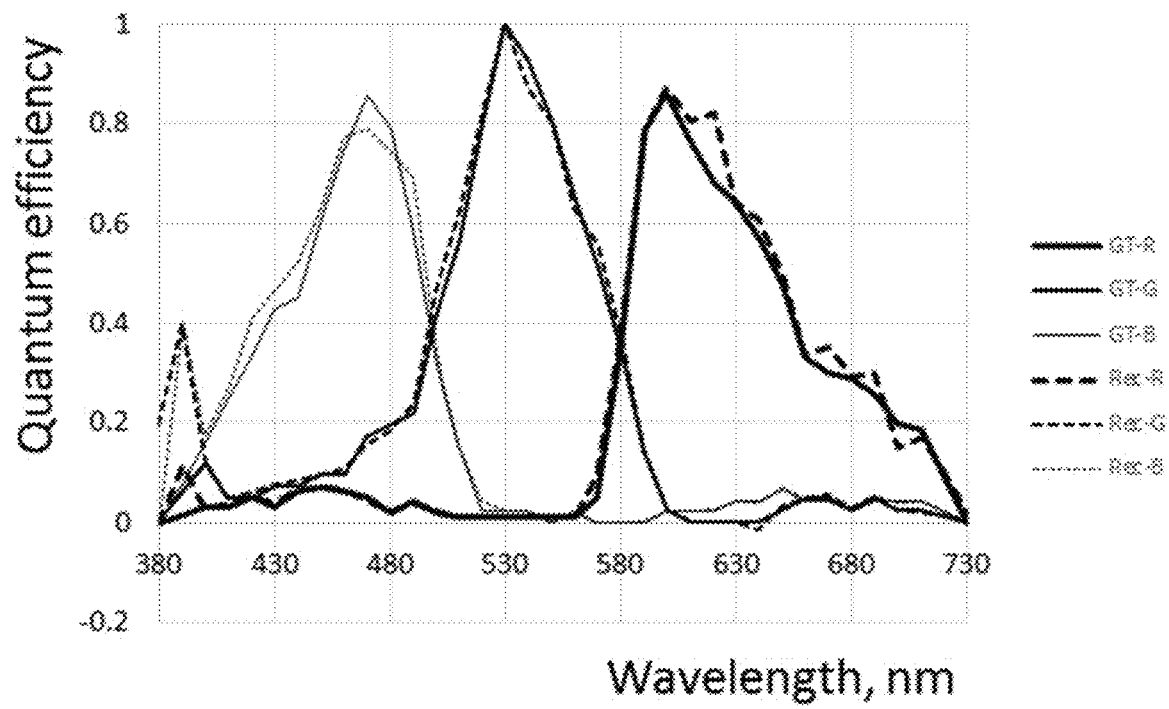
FIG. 8 is a graphical representation of quantum efficiency versus wavelength (nm), in accordance with one embodiment of the disclosure.

Narrow-band band-pass interference filters 34 are offered, for example, by Spectrogon, Omega Optical, and Andover Corporation. The transmission spectra of 10 nm FWHM interference filters 34 manufactured by Omega Optical are published by the manufacturer and some are shown in FIG. 7. It can be appreciated that some overlap occurs in the wavelengths of the transmitted light shown in FIG. 7. As a result of this overlap, simulations showed that recovered QE curves have noticeable standard deviation of error E=0.051192 from ground truth QE curves (FIG. 8), which is consistent with the calculated value of the condition number, 1237.71. In other words, QE curve reconstruction with a high condition number does not result in a close match to the ground truth values for red, green, and blue channels.

Figure 10:
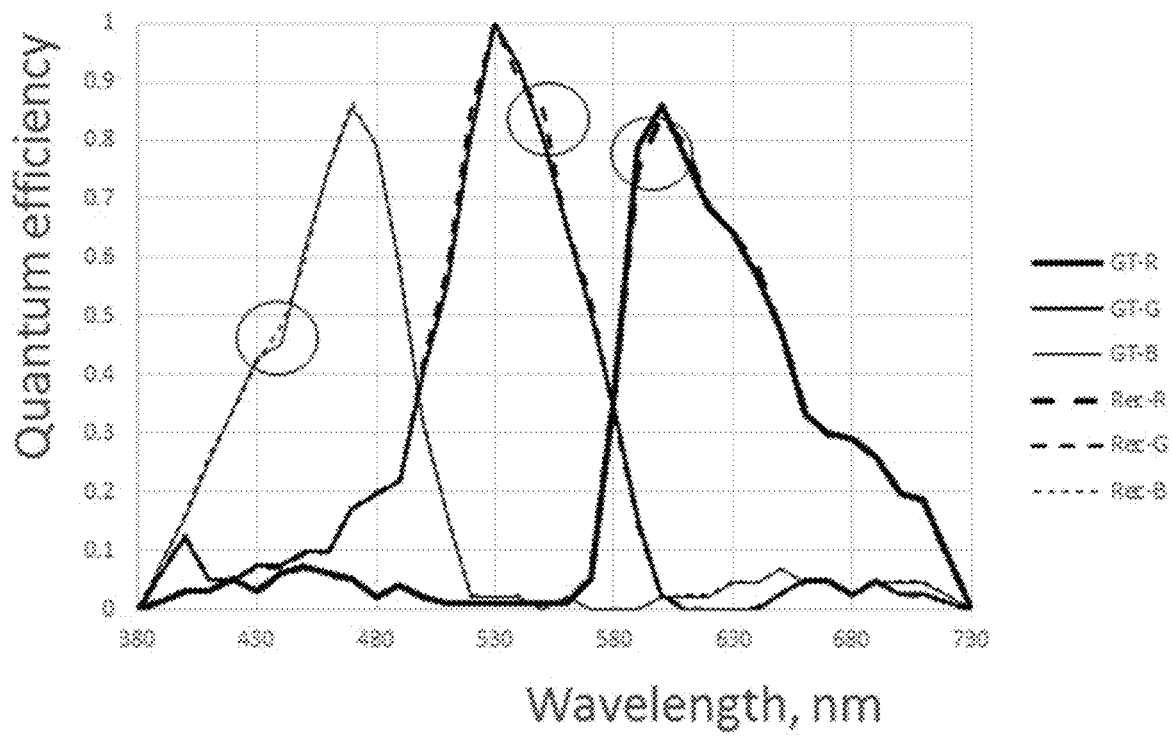
FIG. 10 is a graphical representation of quantum efficiency versus wavelength (nm), in accordance with one embodiment of the disclosure.

The interference filters 34 from Andover Corporation, which can be ultra-narrow band-pass interference filters, for example, have FWHM=3 nm. The spectra of the ultra-narrow band-pass interference filter have almost no overlap, the standard deviation of error E=0.00204, and the condition number is 1.003775. FIG. 10 illustrates a close match to the ground truth values, with about 5% color acquisition noise when for a color calibration setup utilizing interference filter 34 configured as an ultra-narrow band-pass filter. Highlighted in the circled regions of FIG. 10 are the regions with the most pronounced reconstruction errors.

Figure 11:
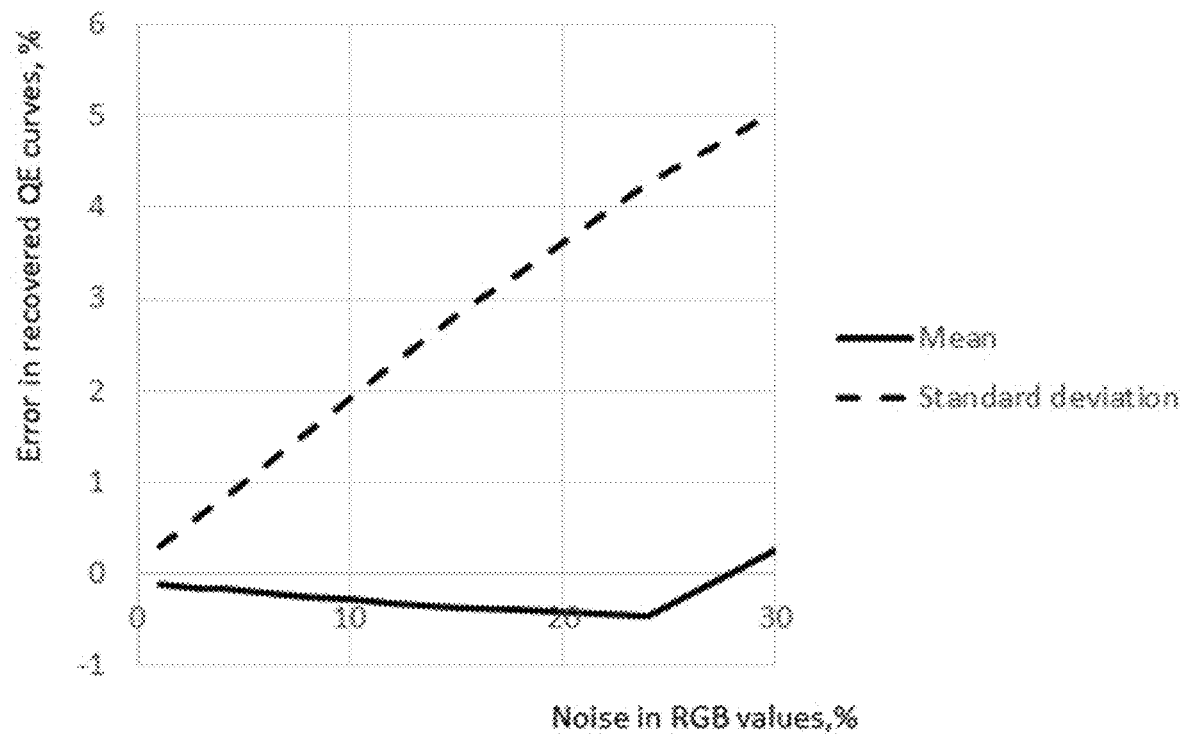
FIG. 11 is a graphical representation of percent error in recovered quantum efficiency curves versus percent noise in red, green, and blue values.

FIG. 11 illustrates a dependence of error in recovered QE curves as a function of error in measured RGB values. Interestingly, the simulations indicate that with use of the improved colorimetric calibration system and method described herein, even noisy measurements of RGB values lead to smaller noise in recovered QE curves, which is demonstrated in FIG. 11. For RGB values with an error of 15%, the standard deviation of error for QE curves is less than 3%.

Figure 12:
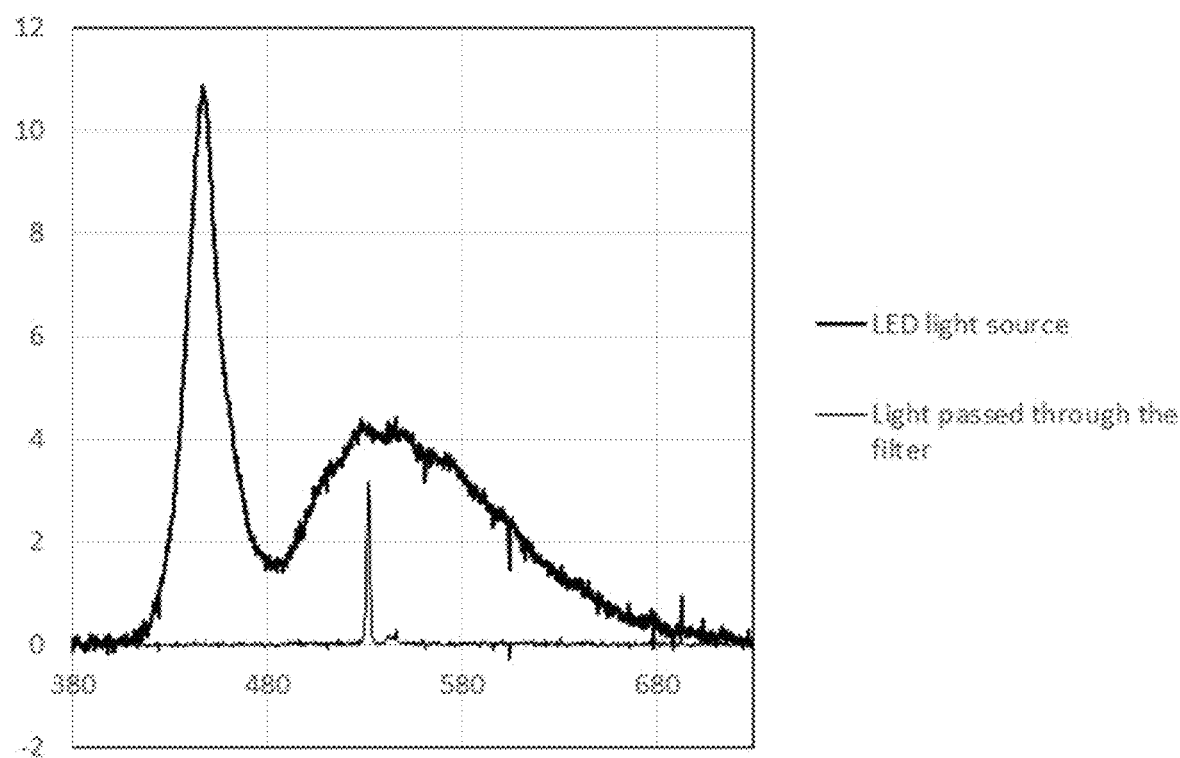
FIG. 12 is a graphical representation of a light spectrum comparison of light from an LED source and light passed through a diffuser and a filter.

As the cost of a full set of interference filters 34 (for example, greater than about 36) can be high, one interference filter 34 that was at hand was used, specifically the interference filter 34 with maximum transmittance at $\lambda$=532 nm and FWHM=3 nm manufactured by Thorlabs. Using the setup shown in FIG. 1, spectra of light were recorded passing through light diffuser plate 36 only and compared to spectra of light recorded passing through both light diffuser plate 36 and interference filter 34 (FIG. 12). It can be appreciated that use of a wide spectrum interference filter or lack of use of a filter allows a broader spectral range into the camera sensor and, as a result, yield amplified input data errors to system 100. Use of a single ultra-narrow interference filter or a set of narrow-band interference filters which have at least partially overlapping spectral ranges can be used to limit the received spectrum of light and thereby yield minimized errors, a reduced condition number, and an improved QE curve result. Use of narrow-band interference filters with partially overlapping spectral ranges such that only light with ultra-narrow bandwidth passes through all of them may provide an equivalent wavelength range output to an ultra-narrow interference filter. In utilizing partially overlapping narrow-band interference filters, each filter may absorb some of the light intensity and, as a result, the final transmitted light may have a lower intensity value when using partially overlapping filters. However, it is possible that use of overlapping narrow-band interference filters may be at a lower cost than use of ultra-narrow interference filters.

Figure 13:
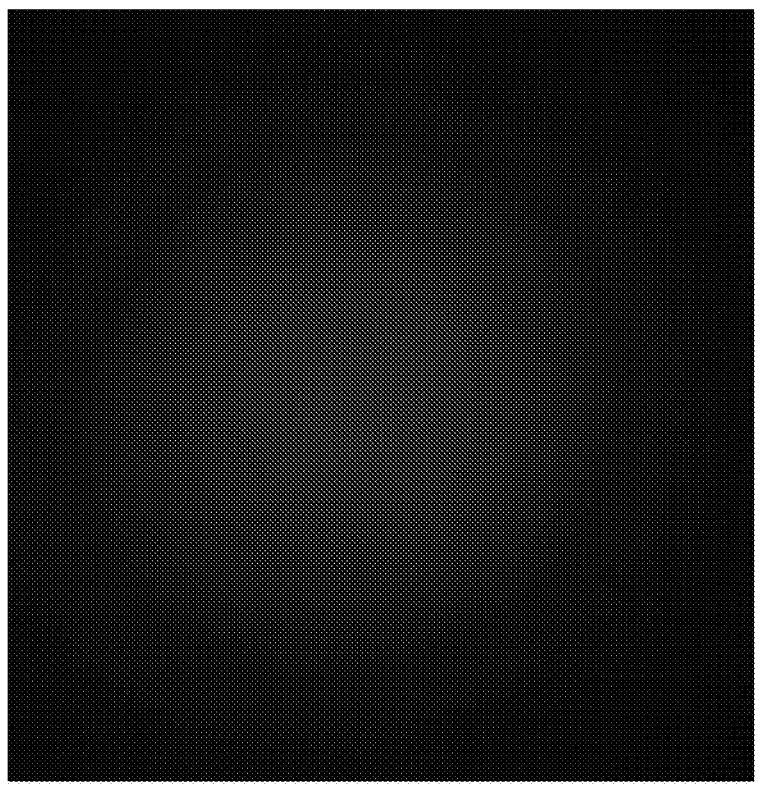
FIG. 13 is a photograph of light passing through a bandpass filter.
Figure 14:
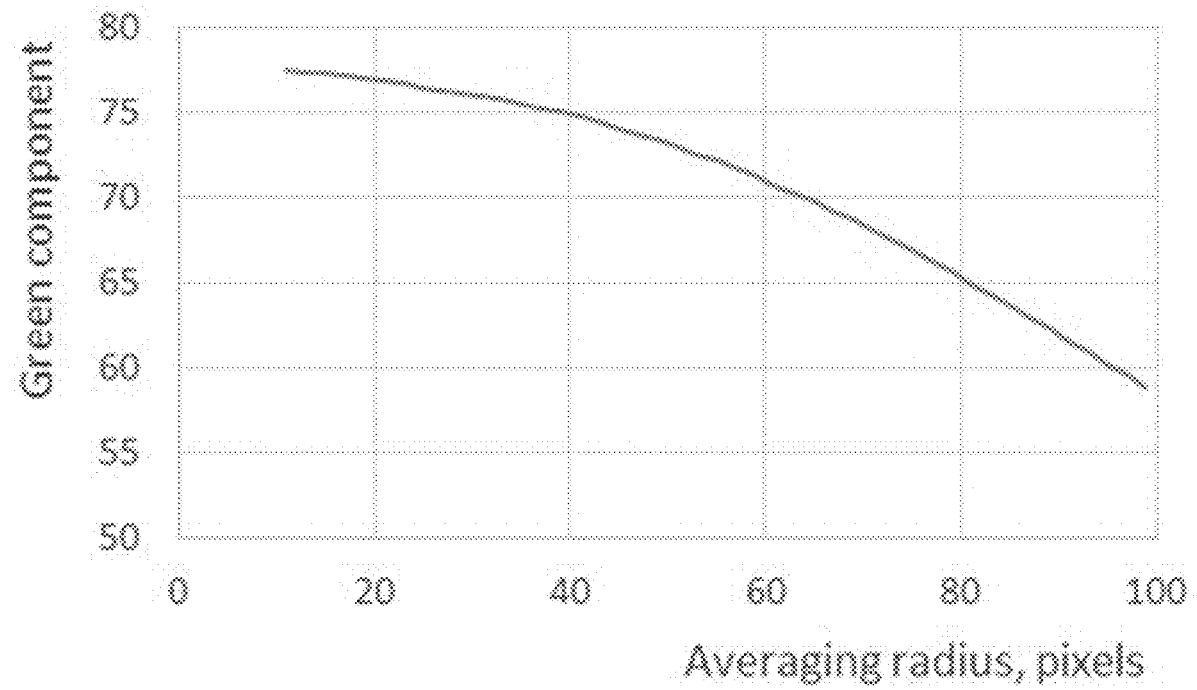
FIG. 14 is a graphical representation of the measured value in a green channel versus the radius of averaging (pixels).

FIG. 13 illustrates an example photograph of light passing through a bandpass filter. In this example, a bandpass filter was used and only light of a single wavelength was allowed to pass through, with more intensity of light focused in the center of the image. In some embodiments, a green light bandpass filter may be used. FIG. 14 illustrates a graphical representation of the radius of averaging (pixels) versus the measured value in a green channel. It can be appreciated that the measured value in the green channel decreases as the radius of averaging increases.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A color calibration system comprising:
    at least one broad spectrum light emitting diode configured to transmit light;
    at least one light diffuser plate;
    a plurality of interference filters, the plurality of interference filters configured to limit the light to a narrow band; and
    a processor, configured to create a map of light intensity values using the transmitted light and to determine quantum efficiency for at least red, green, and blue channels based on the light intensity values.

2. The color calibration system of claim 1, wherein the quantum efficiency measured by the system is within 5% error of a ground truth quantum efficiency.

3. The color calibration system of claim 1, further comprising a camera comprising at least one sensor configured to detect colors.

4. The color calibration system of claim 3, wherein the at least one sensor is configured to detect light transmitted by the at least one broad spectrum light emitting diode.

5. The color calibration system of claim 3, wherein an intensity value is mapped for each pixel of the at least one sensor.

6. The color calibration system of claim 5, wherein a condition number calculated during conversion of the light intensity values to quantum efficiency is between 1 and 1.5.

7. The color calibration system of claim 5, wherein a standard deviation of Gaussians is less than 7 nm.

8. The color calibration system of claim 5, wherein calibration of red, green, and blue channels fulfills a set of Luther conditions.

9. The color calibration system of claim 5, wherein the at least one sensor is at least one of a CMOS sensor or a CCD sensor.

10. The color calibration system of claim 1, wherein the quantum efficiency is a fraction of photon flux that contributes to photocurrent in a pixel of the at least one sensor.

11. The color calibration system of claim 1, wherein a width/diameter of at least one of the plurality of interference filters is between 1.27 cm and 2.54 cm.

12. The color calibration system of claim 1, wherein the plurality of interference filters is a set of at least 30 filters.

13. The color calibration system of claim 1, wherein the plurality of interference filters is at least one ultra-narrow bandpass filter with FWHM equal to 3 nm or less.

14. The color calibration system of claim 1, wherein the plurality of interference filters is a set of narrow-band bandpass filters.

15. A color calibration system comprising:
at least one broad spectrum light emitting diode configured to transmit light;
at least one light diffuser plate;
a camera, the camera comprising at least one sensor for detection of colors from the transmitted light;
a processor, configured to create a map of light intensity values using the transmitted light and to determine quantum efficiency for at least red, green, and blue channels based on the light intensity values; and
a plurality of interference filters, the plurality of interference filters configured to limit the light to a narrow band,
wherein the light is used to calibrate the at least one sensor.

16. The color calibration system of claim 15, wherein the plurality of interference filters are configured in an array.

17. A method of performing color calibration comprising:
transmitting light from at least one broad spectrum light emitting diode;
scattering light with at least one light diffuser plate;
filtering light with at least one interference filter, the at least one interference filter configured to limit the light to a narrow band;
detecting light at a camera sensor;
mapping, via a processor, an intensity value for each pixel of the camera sensor using the transmitted light; and
creating at least one quantum efficiency curve for each of red, green, and blue channels based on the light intensity values.

18. The method of performing color calibration of claim 17, further comprising using the at least one quantum efficiency curve to calibrate a camera.

19. The method of performing color calibration of claim 17, wherein the at least one interference filter is at least one ultra-narrow bandpass filter with FWHM equal to 3 nm or less.

20. The method of performing color calibration of claim 17, wherein the at least one interference filter is a set of two or more narrow-band bandpass filters.

21. The method of performing color calibration of claim 17, wherein a condition number calculated during conversion of intensity values to quantum efficiency is between 1 and 1.5.

22. The method of performing color calibration of claim 17, wherein standard deviation of Gaussians is less than 7 nm.

23. The method of performing color calibration of claim 17, wherein calibration of red, green, and blue channels fulfills a set of Luther conditions.

24. A colorimetric calibration system comprising:
a chromatic projector contained in a housing, the chromatic projector comprising:
at least one broad spectrum light emitting diode, the at least one broad spectrum light emitting diode connected to a power source;
a light diffuser plate; and
an array comprising a plurality of narrow-band interference filters; and
a processor, configured to create a map of light intensity values using transmitted light and to determine quantum efficiency for at least red, green, and blue channels based on the light intensity values,
wherein light is configured to travel from the light source, through the light diffuser plate, and through the plurality of narrow-band interference filters.

25. The colorimetric calibration system of claim 24, wherein a first interference filter of the plurality of narrow-band interference filters limits light wavelength to be between about 478 nm and about 482 nm, a second interference filter of the plurality of narrow-band interference filters limits light wavelength to be between about 498 nm and about 502 nm, and a third interference filter of the plurality of narrow-band interference filters limits light wavelength to be between about 518 nm and about 522 nm.

26. The colorimetric calibration system of claim 25, further comprising a camera, the camera comprising at least one lens to receive the light from the plurality of narrow-band interference filters.

27. The color calibration system of claim 1, wherein a value of light intensity for a corresponding wavelength of light is determined for each of the at least one broad spectrum light emitting diodes.

28. The color calibration system of claim 1, wherein the at least one light diffuser plate is positioned between the at least one broad spectrum light emitting diode and the plurality of interference filters.

* * * * *